Figure 1:
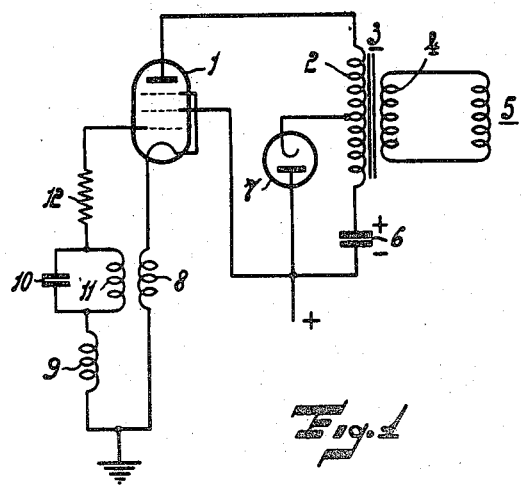

Sept. 30, 1958   A. BOEKHORST   2,854,602
SELF-OSCILLATING CIRCUIT ARRANGEMENT PRODUCING
A SAWTOOTH CURRENT IN A DEFLECTION COIL
Filed Nov. 15, 1955

INVENTOR
ANTONIUS BOEKHORST
BY
AGENT

United States Patent Office 2,854,602
Patented Sept. 30, 1958

2,854,602

SELF-OSCILLATING CIRCUIT ARRANGEMENT PRODUCING A SAWTOOTH CURRENT IN A DEFLECTION COIL

Antonius Boekhorst, Eindhoven, Netherlands, assignor, by mesne assignments, to North American Philips Company, Inc., New York, N. Y., a corporation of Delaware Application November 15, 1955, Serial No. 546,982

Claims priority, application Netherlands December 6, 1954

4 Claims. (Cl. 315—27)

This invention relates to self-oscillating circuit-arrangements producing a sawtooth current in a deflection coil which is coupled to the anode circuit of a regeneratively coupled tube, said circuit-arrangements moreover comprising a series power feed-back-diode circuit.

In such known circuit arrangements, the tube is often fed back via an RC network by means of which a pulse voltage, which is constant and positively directed during the complete upward stroke of the sawtooth current, is supplied to the control-grid of the tube. As is known, it is necessary for a satisfactory operation of the circuit that the tube should deliver a considerable current for more than half the duration of the upward stroke of the sawtooth current, when the control grid potential is substantially equal to the cathode potential. This is in effect ensured by the aforesaid known circuit-arrangement. However, stability of such a known circuit-arrangement leaves much to be desired. The present invention has for its object to provide a circuit-arrangement which is more stable and less sensitive to microphony.

The circuit arrangement in accordance with the invention has the feature that the tube is fed back via a resonant circuit which is at least partly connected in the control-grid circuit of the tube, whilst an inductor is connected in the control-grid circuit in series with the resonant circuit.

Sinusoidal voltages of large amplitude are produced across the resonant circuit. If these voltages are directly supplied to the control-grid of the tube it is not feasible to make the control-grid potential substantially equal to the cathode potential of the tube for more than half the period of the sawtooth current. The invention is based on the recognition that this is possible by means of the inductor connected in the control-grid circuit in series with the resonant circuit.

In the circuit-arrangement in accordance with the invention, the frequency of the sawtooth current produced is for the major part determined by the resonance frequency of the resonant circuit, thus obtaining satisfactory stability. In order that the invention may be readily carried into effect it will now be described with reference to the accompanying drawing, given by way of example, in which Fig. 1 shows a first form of the circuit-arrangement in accordance with the invention and Fig. 2 shows a form in which the tube is fed back differently.

Figure 2:
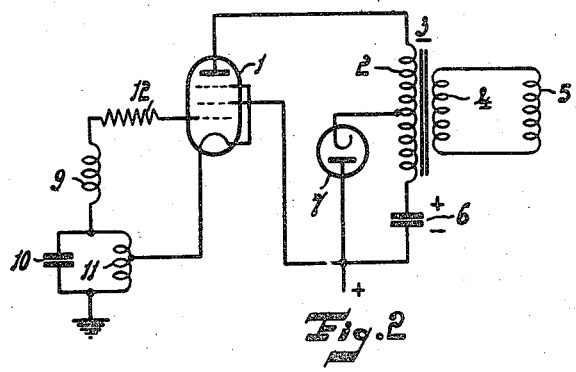

The anode circuit of the tube 1 shown in Fig. 1 comprises the primary winding 2 of a transformer 3. A deflection coil 5 is supplied from the secondary winding 4 of the transformer 3. A capacitor 6 is connected in series with the primary winding 2, the other end of said capacitor being connected to the positive terminal of the anode supply. This terminal of the supply is moreover connected to the anode of a diode 7, the cathode of which is connected to a tapping on the primary winding 2 of the transformer. To be complete it is pointed out that the term diode or series power feed-back-diode circuit is to be understood to include the use of a tube comprising one or more control-grids for controlling the operation of the power feed-back-circuit, such control being unessential for the gist of the present invention.

The operation of the circuit components so far described is known and is described in the text book "Television" by V. K. Zworykin, 2nd ed. (John Wiley & Sons, N. Y., 1954) on pages 564–565. It is only pointed out that a sawtooth current passes through the tube 1 during a time period beginning prior to half the duration of the upward stroke of the sawtooth current in the deflection coil. During the fly-back of the sawtooth current a negative-polarity sinusoidal pulse voltage increase occurs at the anode of the tube 1 which causes the tube 1 to become non-conductive. At the end of the flyback the voltage across the winding 2 drops, the diode 7 becomes conductive and the sawtooth current therethrough tends to rise. The diode 7 should at least remain conductive until the tube 1 becomes conductive. Since the diode 7 becomes conductive a direct voltage of the polarity indicated in the drawing is set up across the capacitor 6, which direct voltage in series with the anode supply is operative in the anode circuit of the tube 1 and increases the anode direct voltage of the tube 1.

The cathode lead of the tube 1 comprises an inductor 8. Connected between the grounded end of the coil 8 and the control-grid of the tube 1 is the series-combination of an inductor 9, a resonant circuit comprising the parallel combination of a capacitor 10 and an inductor 11, and furthermore a resistor 12. The inductor 8 in the cathode lead and the inductor 11 of the resonant circuit are coupled together, so that positive feed-back occurs between the cathode-anode circuit of tube 1 and the grid of tube 1. The cathode-anode signal current of tube 1 passes through the inductor 8, and the electromagnetic field generated thereby is picked up by the inductor 11 with such a polarity that the signal thus produced in the oscillatory circuit 10—11 is applied to the grid of tube 1 in positive feed-back phase so as to cause the tube to be alternatively conductive and non-conductive in an oscillatory manner. The operation of positive feed-back oscillators is well known. The oscillatory action produces a sawtooth-shaped signal which is fed to the coil 5 via the transformer 3.

As a result of said feed-back a sinusoidal voltage of large amplitude is set up across the circuit 10, 11. With a sinusoidal increase in grid voltage of the tube 1, grid current tends to flow at a given instant, thus producing across the inductor 9, due to the grid current passing therethrough, a voltage by which the increase in grid current is counteracted. With a decrease in grid voltage the grid-current tends to drop at a given instant, thus producing across the inductor 9 a voltage promoting the flow of grid current. In the absence of coil 9 the time period during which the grid potential substantially corresponds to the cathode potential will be smaller than half the period of the sinusoidal voltage across the circuit 10, 11. As a result of the aforesaid action of the inductor 9 it has, however, proved possible to make the said time period longer than half the voltage period.

The series resistor 12 serves to limit the grid current, to avoid parasitic oscillations which might result from resonance of the circuit constituted by the inductor 9 and the grid-cathode capacity of the tube 1, and to further improve upon the control-grid voltage.

In one form of the circuit-arrangement shown in Fig. 1, the inductance of the inductor 8 was approximately 0.5 $\mu$h., that of the coil 9 approximately 200 $\mu$h., the inductor 11 having an inductance of 10 $\mu$h. and the resistor 12 having a value of approximately 20,000 ohms. An alternating voltage of 20 v. was set up across the ductor 8 and an alternating voltage of 400 v. produced across the circuit 10, 11.

In the circuit-arrangement shown in Fig. 2, parts corresponding to those shown in Fig. 1 have the same reference numerals. The circuit-arrangement shown in Fig. 2 differs from that shown in Fig. 1 only in that feed-back of the tube 1 is now obtained by connecting the cathode of tube 1 to a tapping on the inductor 11 of the circuit.

What is claimed is:

1. A self-oscillating circuit for producing a sawtooth current in a coil, comprising an amplifier tube having a cathode, an anode and a grid, said cathode and anode being connected in a space discharge path of said tube, a two-terminal source of operating voltage, an anode circuit comprising a transformer connected between said anode and said coil, said transformer comprising at least one winding, means connecting an end of said winding to said anode, a capacitor connected between the other end of said winding and a terminal of said voltage source, means coupling said coil to said transformer winding, a diode having an anode connected to said terminal of said voltage source and having a cathode connected to a point on said winding, means connecting the remaining terminal of said voltage source to said cathode, a grid circuit connected between said grid and said remaining voltage terminal and comprising a parallel resonant circuit, means connected to inductively couple said parallel resonant circuit to said space discharge path to provide positive feedback for said tube thereby causing said tube to oscillate whereby said grid draws current and said tube is conductive during a portion of the oscillatory cycle, and an inductor connected in said grid circuit in series with said resonant circuit thereby to increase the time during which said tube is conductive.

2. A circuit as claimed in claim 1, including a resistor connected in said grid circuit in series with said inductor and oscillatory circuit, thereby to limit said grid current.

3. A self-oscillating circuit for producing a sawtooth current in a coil, comprising an amplifier tube having a cathode, an anode and a grid, a source of operating voltage, a transformer having primary and secondary windings, means connecting said coil to said secondary winding, means connecting said anode to an end of said primary winding, a capacitor connected between the remaining end of said primary winding and a terminal of said voltage source, a diode having an anode connected to said terminal and a cathode connected to a point on said primary winding, a first inductor connected between said cathode and the remaining terminal of said voltage source, a grid circuit comprising a resonant circuit connected in series between said grid and said remaining voltage terminal, said resonant circuit comprising a second inductor and a capacitor connected in parallel, said second inductor being coupled to said first inductor to provide positive feedback for said tube thereby causing said tube to oscillate whereby said grid draws current and said tube is conductive during a portion of the oscillatory cycle, and a third inductor connected in said grid circuit in series with said resonant circuit thereby to increase the time during which said tube is conductive.

4. A self-oscillating circuit for producing a sawtooth current in a coil, comprising an amplifier tube having a cathode, an anode and a grid, a source of operating voltage, a transformer having primary and secondary windings, means connecting said coil to said secondary winding, means connecting said anode to an end of said primary winding, a capacitor conected between the remaining end of said primary winding and a terminal of said voltage source, a diode having an anode connected to said terminal and a cathode connected to a point on said primary winding, a first inductor connected in part between said cathode and the remaining terminal of said voltage source, a grid circuit comprising a capacitor connected in parallel with said first inductor to form a resonant circuit, means connecting said resonant circuit to said grid thereby to provide positive feedback for said tube thereby causing said tube to oscillate whereby said grid draws current and said tube is conductive during a portion of the oscillatory cycle, and a second inductor connected in said grid circuit in series with said resonant circuit thereby to increase the time during which said tube is conductive.

References Cited in the file of this patent
UNITED STATES PATENTS
2,686,276     Anderson _____ Aug. 10, 1954